US012642410B2

(12) United States Patent
Walz et al.

(10) Patent No.: US 12,642,410 B2
(45) Date of Patent: Jun. 2, 2026

(54) FLOOR CLEANING SYSTEM

(71) Applicant: ALFRED KÄRCHER SE & CO. KG, Winnenden (DE)

(72) Inventors: Jürgen Walz, Winnenden (DE); Lukas Sobotta, Winnenden (DE); Alexander Brändle, Winnenden (DE); Denis Dammköhler, Winnenden (DE); Marten Jahn, Winnenden (DE); Miriam Ungerer, Winnenden (DE)

(73) Assignee: ALFRED KÄRCHER SE & CO. KG, Winnenden (DE)

( * ) Notice: Subject to any disclaimer, the term of this patent is extended or adjusted under 35 U.S.C. 154(b) by 446 days.

(21) Appl. No.: 18/058,786

(22) Filed: Nov. 25, 2022

(65) Prior Publication Data

US 2023/0200614 A1      Jun. 29, 2023

Related U.S. Application Data

(63) Continuation of application No. PCT/EP2021/064012, filed on May 26, 2021.

(30) Foreign Application Priority Data

May 27, 2020      (DE) ..................... 10 2020 114 179.3

(51) Int. Cl.
*A47L 11/40* (2006.01)
*A47L 11/24* (2006.01)
(Continued)

(52) U.S. Cl.
CPC ........... *A47L 11/4011* (2013.01); *A47L 11/24* (2013.01); *A47L 11/283* (2013.01);
(Continued)

(58) Field of Classification Search
CPC .... A47L 11/4011; A47L 11/24; A47L 11/283; A47L 11/4008; A47L 11/4066;
(Continued)

(56) References Cited

U.S. PATENT DOCUMENTS 8,719,998 B1     5/2014  Huffman
9,367,044 B2     6/2016  Troff et al.
(Continued)

FOREIGN PATENT DOCUMENTS

CN          101357054          2/2009
CN          103025223          4/2013
(Continued)

OTHER PUBLICATIONS

Machine Translation of EP2387931A2 (Year: 2011).*
(Continued)

*Primary Examiner* — Brandon D Lee
(74) *Attorney, Agent, or Firm* — Sheridan Ross P.C.

(57) ABSTRACT

The invention relates to a floor cleaning system, comprising a user-guided floor cleaning machine for cleaning a floor surface, a sensor device, a control device, and an actuatable display device, wherein the floor cleaning machine comprises an operating device for a user, a chassis for moving the cleaning machine over the floor surface, and at least one cleaning device having a cleaning tool and preferably a drive device for the cleaning tool, wherein, during operation of the floor cleaning machine, a cleaning path along which, proceeding from a starting point, the cleaning machine travels over the floor surface can be determined by the control device on the basis of signals from the sensor device, and wherein the control device actuates the display device in order to display cleaning-related information, depending upon the cleaning path along which the cleaning machine is determined to have traveled.

31 Claims, 4 Drawing Sheets

(51) Int. Cl.
    *A47L 11/283*     (2006.01)
    *G05D 1/00*     (2024.01)
    *H04N 7/18*     (2006.01)

(52) U.S. Cl.
    CPC ....... *A47L 11/4008* (2013.01); *A47L 11/4066* (2013.01); *A47L 11/4069* (2013.01); *G05D 1/0016* (2013.01); *G05D 1/0044* (2013.01); *H04N 7/183* (2013.01)

(58) Field of Classification Search
    CPC .............. A47L 11/4069; A47L 11/302; A47L 11/4061; A47L 11/4075; A47L 11/293; G05D 1/2245; G05D 1/20; H04N 7/183
    See application file for complete search history.

(56)            References Cited

U.S. PATENT DOCUMENTS

| | | |
|---|---|---|
| 9,924,847 B2 | 3/2018 | Gottinger et al. |
| 10,624,516 B2 | 4/2020 | Cudzilo |
| 10,939,795 B2 | 3/2021 | Persson |
| 11,281,226 B2 | 3/2022 | Gabrecht et al. |
| 2009/0031521 A1 | 2/2009 | Crivellaro |
| 2013/0141211 A1 | 6/2013 | Troff et al. |
| 2016/0081526 A1 | 3/2016 | Gottinger et al. |
| 2017/0007091 A1* | 1/2017 | Walz .................... A47L 11/302 |
| 2017/0049288 A1* | 2/2017 | Knutson ............. A47L 11/4088 |
| 2017/0235312 A1* | 8/2017 | Yoshino ............. A47L 11/4075 |
| | | 700/258 |
| 2021/0137341 A1 | 5/2021 | Dammkoehler et al. |

FOREIGN PATENT DOCUMENTS

| | | | | |
|---|---|---|---|---|
| CN | 103200852 | 7/2013 | | |
| CN | 103327870 | 9/2013 | | |
| CN | 105433859 | 3/2016 | | |
| CN | 108289586 | 7/2018 | | |
| CN | 108968833 | 12/2018 | | |
| CN | 110477824 | 11/2019 | | |
| DE | 102010029238 | 11/2011 | | |
| DE | 102010038420 | 1/2012 | | |
| DE | 102014217843 | 3/2016 | | |
| DE | 102015110140 | 12/2016 | | |
| DE | 102018117670 | 1/2020 | | |
| EP | 2022383 | 2/2009 | | |
| EP | 2387931 | 11/2011 | | |
| EP | 2387931 A2 * | 11/2011 | ............. | A47L 11/29 |
| EP | 3047782 | 7/2016 | | |
| EP | 3366101 | 8/2018 | | |
| JP | 2019-200790 | 11/2019 | | |
| WO | WO 2005/107559 | 11/2005 | | |
| WO | WO 2008/070973 | 6/2008 | | |
| WO | WO 2010/101929 | 9/2010 | | |

OTHER PUBLICATIONS

International Search Report (with English translation) and Written Opinion for International (PCT) Patent Application No. PCT/EP2021/064012, dated Aug. 24, 2021, 11 pages.

Search Report for Germany Patent Application No. 102020114179.3, dated May 6, 2021, 7 pages.

* cited by examiner

FLOOR CLEANING SYSTEM

CROSS-REFERENCE TO RELATED APPLICATIONS

This application is a continuation application of international application number PCT/EP2021/064012, filed on May 26, 2021, and claims the benefit of German application number 10 2020 114 179.3, filed on May 27, 2020, which are incorporated herein by reference in their entirety and for all purposes.

FIELD OF THE INVENTION

The present invention relates to a floor cleaning system, comprising a user-guided floor cleaning machine for cleaning a floor surface, a sensor device, a control device, and an actuatable display device, wherein the floor cleaning machine comprises an operating device for a user, a chassis for moving on the floor surface, and at least one cleaning device having a cleaning tool and, preferably, a drive device for the cleaning tool.

Moreover, the present invention relates to a hand-guided floor cleaning machine for such a floor cleaning system.

BACKGROUND OF THE INVENTION

A floor cleaning machine of the type mentioned at the outset is guided by a user over the floor surface by means of the operating device. The at least one cleaning tool is used to clean the floor surface and is thereby preferably driven by a drive device assigned to it. Dirt can be detached from the floor surface and picked up, for example, by means of a dirt collection device.

Despite the possibilities of automated cleaning by means of a self-propelled and self-steering floor cleaning machine, user-guided floor cleaning machines are of great importance. Advantages are, for example, the simplified design and the higher running time of the floor cleaning machines. In particular, user-guided floor cleaning machines can be used in surrounding areas in which the use of autonomous cleaning machines is not possible or possible only to a limited extent for safety reasons. An experienced user as a "human interface" between the cleaning task and the floor cleaning machine is able to make decisions and implement cleaning tasks more quickly, despite all the advances in the field of autonomous cleaning, which is why cleaning tasks can be carried out more quickly with user-guided floor cleaning machines than with autonomous floor cleaning machines.

It would be desirable to assist the user in guiding the floor cleaning machine for a better cleaning result, wherein, preferably, the degree of complexity in the design of the floor cleaning machine can be kept relatively low.

An object underlying the present invention is to provide a generic floor cleaning system with the possibility of assisting the user in performing the cleaning task.

SUMMARY OF THE INVENTION

In an aspect of the invention, a floor cleaning system is provided. The floor cleaning system comprises a user-guided floor cleaning machine for cleaning a floor surface, a sensor device, a control device, and an actuatable display device. The floor cleaning machine comprises an operating device for a user, a chassis for moving the cleaning machine over the floor surface, and at least one cleaning device having a cleaning tool and preferably a drive device for the cleaning tool. During operation of the floor cleaning machine, a cleaning path along which, proceeding from a starting point, the cleaning machine travels over the floor surface is determinable by the control device on the basis of signals from the sensor device. The control device actuates the display device in order to display cleaning-related information, depending upon the cleaning path along which the cleaning machine is determined to have traveled.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
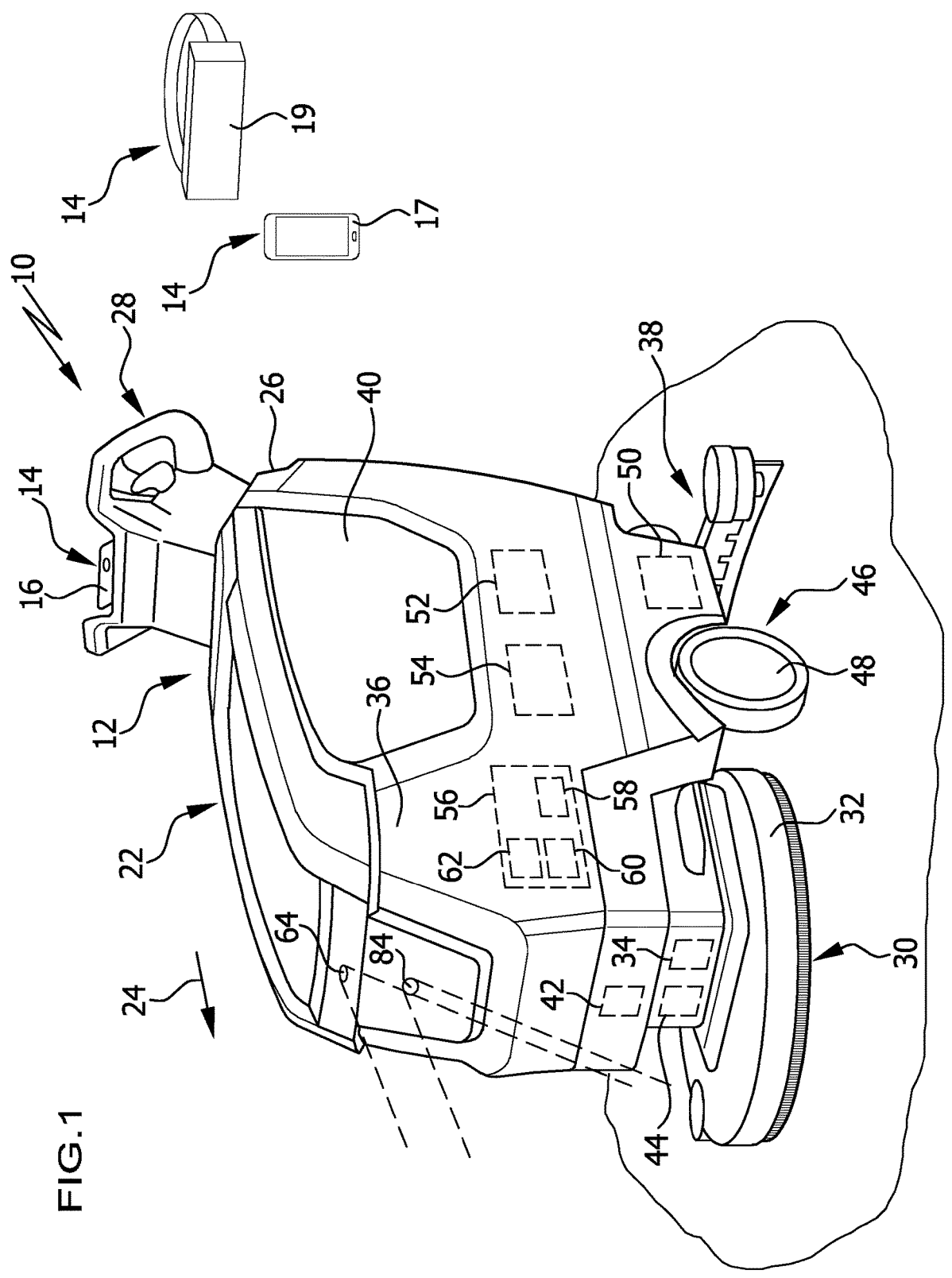
FIG. 1: a schematic perspectival representation of a floor cleaning system in accordance with the invention, comprising a floor cleaning machine and an external accessory device.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a floor cleaning system comprising a user-guided floor cleaning machine for cleaning a floor surface, a sensor device, a control device, and an actuatable display device. The floor cleaning machine comprises an operating device for a user, a chassis for moving the cleaning machine over the floor surface, and at least one cleaning device having a cleaning tool and preferably a drive device for the cleaning tool.

During operation of the floor cleaning machine, a cleaning path along which, proceeding from a starting point, the cleaning machine travels over the floor surface is determinable by the control device on the basis of signals from the sensor device. The control device actuates the display device in order to display cleaning-related information, depending upon the cleaning path along which the cleaning machine is determined to have traveled.

With the floor cleaning system, in accordance with the invention, the control device is designed to display cleaning-related information on the display device, e.g., by means of augmented reality (AR, augmented reality), to support the user in performing a cleaning task. Thereby, it is provided in particular that, during operation of the floor cleaning device, the traveled cleaning path be determined and that the cleaning-related information depend upon the determined cleaning path. The cleaning path is determined proceeding from a starting point.

The cleaning-related information may comprise, for example, information concerning the cleaning path already traveled. In particular, it can thereby be taken into account that the starting point is already known to the user, since the floor cleaning machine is user-guided. In addition, it can preferably be taken into account that the user is familiar with the room he is cleaning with the floor cleaning machine. This can preferably eliminate the need for mapping information concerning the cleaning path (path route and starting point). The outfitting of the floor cleaning machine in this regard can be reduced so as to simplify its design in comparison with autonomous floor cleaning machines.

In accordance with the above, it is favorable if the traveled cleaning path is determined free of mapping. In particular, localization of the floor cleaning machine in the surrounding area or room containing the floor surface can be omitted, in particular, because the user guides the floor cleaning machine himself through the surrounding area or room. In this manner, the requirements for the sensor device and the control device can be significantly reduced compared to autonomous floor cleaning machines. Complex data acquisition and processing is avoidable, considering the "human interface" of the user.

In particular, advantageously, no map of a room comprising the floor surface, within which map the starting point and/or the cleaning path is localized, is provided. In particular, the floor cleaning system does not have a map. This can reduce otherwise required characteristic landmarks (for example, beacons) in the field of autonomous floor cleaning, for example, which must be employed in connection with the use of maps.

Preferably, the starting point and/or the traveled cleaning path is determined without position information with respect to the floor surface and/or a room comprising the floor surface.

Accordingly, preferably only the traveled cleaning path is determined, but position information and/or route information in an absolute reference system (e.g., via GPS) and/or a relative reference system (e.g., spatially related via beacons or the like) is not determined. The tracking of the floor cleaning machine in a map can be omitted.

The traveled cleaning path can be determined, for example, in the manner of a polygonal traverse. For example, the cleaning path can be determined by dead reckoning using the signals from the sensor device. In particular, there is no positional linking of the cleaning path information with a map and/or a reference system.

It is advantageous if the traveled cleaning path is determined only when the drive device of at least one cleaning tool is activated. The cleaning tool can be driven by means of the drive unit preferably provided for this purpose. Using the drive device, it is possible, for example, to check whether the cleaning task has been properly completed by the user. If the floor cleaning machine is only moved, but the drive device is not activated, it must be assumed that the cleaning task has not been performed and that the floor cleaning machine is running empty.

The sensor device, as at least one sensor, can comprise or form, for example, wheel encoders for the chassis. By means of the signals from the wheel encoders, the distance traveled by the floor cleaning machine and/or changes in direction of travel can be determined.

The sensor device, as at least one sensor, can have, for example, an acceleration sensor. By means of the acceleration sensor, for example, start-up and deceleration processes and/or curve travel of the floor cleaning machine can be determined in order to determine the cleaning path.

The sensor device, as at least one sensor, can comprise or form, for example, a rotation rate sensor. For example, direction change information can be acquired via the rotation rate sensor to determine the cleaning path.

The sensor device, as at least one sensor, can comprise or form, for example, a camera. Camera information can be evaluated, for example, using image processing algorithms to determine the distance traveled and/or changes in direction.

Favorably, the floor cleaning system comprises a camera for providing images of a surrounding area located ahead of the floor cleaning machine in a direction of movement, wherein the images can be displayed on the display device together with the cleaning-related information. In this manner, the cleaning-related information can be visualized in a user-friendly way for the user. The images of the surrounding area can also be displayed on the display device. In this manner, a user-friendly option is provided for guiding the user in directing the floor cleaning machine.

It is particularly advantageous if the cleaning-related information is displayed in a manner graphically superimposed on the images of the surrounding area on the display device. Thereby, the cleaning-related information can be displayed in particular by means of augmented reality (AR, augmented reality), depending upon the traveled cleaning path.

The camera is preferably arranged in a defined relative position on the floor cleaning machine. In this manner, a predetermined geometric relationship of the camera to the images of the surrounding area can be created, without the need for localization and mapping.

For example, the floor cleaning machine comprises the camera.

Alternatively or in addition, it can be provided that a portable accessory device, which will be discussed below, comprises the camera.

The cleaning-related information preferably comprises at least one of the following, wherein such information can be displayed, at least in part, preferably by means of augmented reality superimposed on the images of the camera, on the display device:

a display of thus far cleaned sections of the floor surface;

a display of sections of the floor surface that have not yet been cleaned;

a display of sections of the floor surface that are still to be cleaned;

information for the user on guiding the floor cleaning machine, in particular, instructions on the direction of travel of the floor cleaning machine;

information concerning the use that has taken place of at least one cleaning tool for cleaned sections of the floor surface;

information concerning the recommended use of at least one cleaning tool for uncleaned sections of the floor surface;

information concerning the value of at least one operating parameter for cleaned sections of the floor surface;

information concerning the recommended value of at least one operating parameter for uncleaned sections of the floor surface.

Exemplary operating parameters include the amount of cleaning liquid applied to the floor surface, the metering of a cleaning chemical, the contact pressure of the cleaning tool, or the drive power for the cleaning tool.

It can be provided that at least one sensor device, at least one control device, and/or at least one display device be provided. For example, the devices specified above may be distributed between the floor cleaning machine and an accessory device of the floor cleaning system, wherein the floor cleaning machine and the accessory device can have any of the devices specified above.

For example, it can be provided that the floor cleaning machine at least partially comprises or forms at least one of the following:

the sensor device;

the control device;

the display device.

The floor cleaning system can comprise at least one portable accessory device, which is operatively connected to the floor cleaning machine via cooperating communications interfaces. The connection can be wireless and/or wired.

The accessory device can at least partially comprise or form at least one of the following:

the sensor device;

the control device;

the display device.

With a preferred embodiment of the floor cleaning system, a tablet computer, a smartphone, or a head-mounted display, for example, can be provided as a portable accessory device, wherein the latter is configured as data goggles, for example.

It is advantageous if the floor cleaning machine comprises a receptacle for detachably arranging the at least one portable accessory device. The receptacle is preferably arranged on the operating device.

Favorably, the accessory device, and with it a camera comprised by the accessory device for taking images of the surrounding area, can be arranged in a defined relative position on the floor cleaning machine.

Preferably, the floor cleaning system comprises a storage device for storing at least one traveled cleaning path.

Alternatively or in addition, the floor cleaning system preferably comprises a storage device for storing at least one predetermined cleaning path. In particular, the traveled cleaning path and the predetermined cleaning path can be stored in a common storage device.

For example, it is provided that the floor cleaning machine and/or that the accessory device at least partially comprises the storage device.

It is advantageous if the traveled cleaning path and/or the predetermined cleaning path can be stored so as to be linked to cleaning-related information concerning the use of at least one cleaning tool and/or the value of at least one operating parameter. For example, a traveled cleaning path can be evaluated along with the supplemental cleaning-related information. The use of the cleaning tool and/or the value of the operating parameter can be evaluated in order to check the cleaning task. The stored information can be used to direct users in performing cleaning tasks. Based upon the stored information, suggestions for improvement can be made for the performance of cleaning tasks. The predetermined cleaning path can be used by a user performing a cleaning task, with a view to achieving the best possible cleaning result.

Preferably, a plurality of traveled cleaning paths can be stored and, with regard to an optimized cleaning path, evaluated, in particular, so as to be linked to information concerning the use that has taken place of at least one cleaning tool and/or the value of at least one operating parameter. In this manner, measures can be taken to improve the cleaning result by optimizing the cleaning path, the use of the cleaning tool, and/or the value of at least one operating parameter.

It can be advantageous if the at least one predetermined cleaning path can be activated when cleaning is initiated, and cleaning-related information can be displayed on the display device. For example, when cleaning is initiated at the starting point, the user can load the predetermined cleaning path and cleaning-related information from the storage device. At least one of the following items of information can preferably be displayed on the display device:

information for the user on guiding the floor cleaning machine, in particular, instructions on the direction of travel of the floor cleaning machine;

a display of sections of the floor surface to be cleaned;

information concerning the recommended use of at least one cleaning tool for uncleaned sections of the floor surface;

information concerning the recommended value of at least one operating parameter for uncleaned sections of the floor surface.

The above information can be perceived by the user as an instruction for performing a cleaning task based upon the specified cleaning path.

Favorably, the floor cleaning system comprises a camera for providing images of a surrounding area ahead of the floor cleaning machine in a direction of movement, wherein the images can be displayed on the display device together with the cleaning-related information. Preferably, the above information can be displayed by means of augmented reality on the display device superimposed on the images of the surrounding area. For example, travel information can be displayed using directional arrows. A surface to be cleaned can be highlighted by a color and/or texture. The same applies to a surface that has already been cleaned. Alternatively or in addition, the use of a cleaning tool can be symbolized by means of color and/or texture. The same can be correspondingly provided, for example, for the value of an operating parameter.

The predetermined cleaning path preferably comprises information concerning the starting point for the cleaning process, which information can be displayed on the display device. Since the user acts as the interface between the cleaning task and the floor cleaning machine, the user can guide the floor cleaning machine itself to a suggested starting point. For this purpose, for example, the designation of the starting point in words and/or a display of the starting point by means of a photograph or a pictogram can be sufficient.

In a preferred embodiment, the floor cleaning system can comprise at least one localization element that is assigned to a room to be cleaned, wherein a link between the room and the predetermined cleaning path is stored in the storage device, and wherein the localization element can be detected by means of the sensor device, and the predetermined cleaning path can be provided depending upon the detected localization element. For example, several cleaning paths, which are assigned to a respective room, are stored in the storage device. The sensor device can be used to detect the room whose assigned cleaning path is to be loaded for the cleaning process. For example, the localization element can be detected wirelessly. The use of RFID technology or the use of a beacon (for example, detectable via Bluetooth) to identify the room is conceivable.

In the advantageous embodiment last mentioned, it is, preferably, in particular unnecessary to provide a map of the room, as explained above. The specified cleaning path can be stored free of mapping and position information.

It can be advantageous if the traveled cleaning path and the predetermined cleaning path can be checked for a match by the control device. While the cleaning process is being performed, the control device can check, for example, whether the traveled cleaning path determined matches or deviates from the predetermined cleaning path.

If there is no match, for example, an indication to this effect can be output to the user, in particular, on the display device. In this manner, the user can be informed that his manner of cleaning the floor differs from the suggested manner of cleaning the floor.

Alternatively or in addition, it can be provided that, if there is no match, the predetermined cleaning path stored in the storage device be replaced by the determined cleaning path after completion of the cleaning. This possibility is based upon the consideration that the cleaning process can be improved by the user, for example, and the predetermined cleaning path be replaced. It is also conceivable that the geometry of the room, and thus the possibility of moving the floor cleaning machine, deviates from the specified cleaning path, and that a modified cleaning path be proposed for future cleaning processes.

The floor cleaning system can preferably comprise a projection device, wherein cleaning-related information is preferably projectable onto the floor surface. With the cleaning-related information, depending upon the determined cleaning path and/or based upon the predetermined cleaning path, the information can be projected for visualization for the user. In particular, it is conceivable to visualize the information specified above: cleaned sections of the floor surface, sections not yet cleaned, sections to be cleaned, traversal information, information concerning the use of a cleaning tool, and information concerning the value of an operating parameter.

For example, the floor cleaning machine can comprise a traction drive for drive wheels of the chassis.

For example, the floor cleaning machine can be a walk-behind machine, a ride-on machine, or a stand-upon machine.

The floor cleaning machine can, for example, be a scrubbing machine or a sweeper.

For example, the floor cleaning system can comprise a plurality of floor cleaning machines. In particular, it can be provided that the aforementioned accessory device be able to be used selectively with one of the floor cleaning machines.

A floor cleaning machine in accordance with the invention is suitable for forming a floor cleaning system of the type specified above.

FIG. 1 shows a perspectival representation of an advantageous embodiment of a floor cleaning system in accordance with the invention, which is denoted overall by the reference numeral 10. The floor cleaning system 10 comprises a floor cleaning machine 12 in accordance with the invention and an external, in the present case, portable, accessory device 14, which is configured as a tablet computer 16.

As an accessory device 14, a smartphone 17 and/or a head-mounted display 19 of the floor cleaning system 10 configured as data goggles can, alternatively or in addition, be used.

Figure 3:
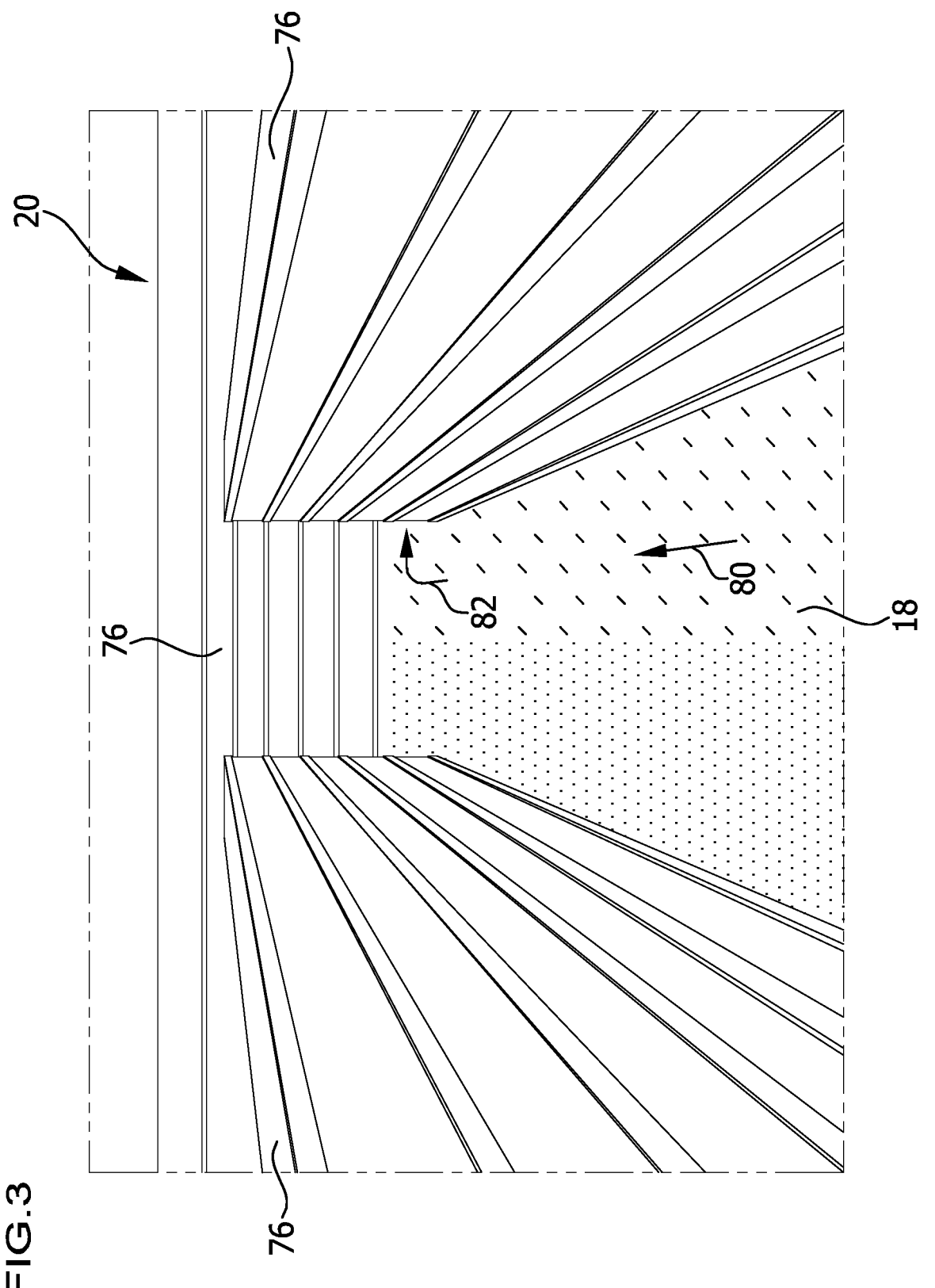
FIG. 3: a schematic representation of the image content of a display device of the floor cleaning system of FIG. 1, wherein cleaning-related information is shown as image content, among other things.
Figure 4:
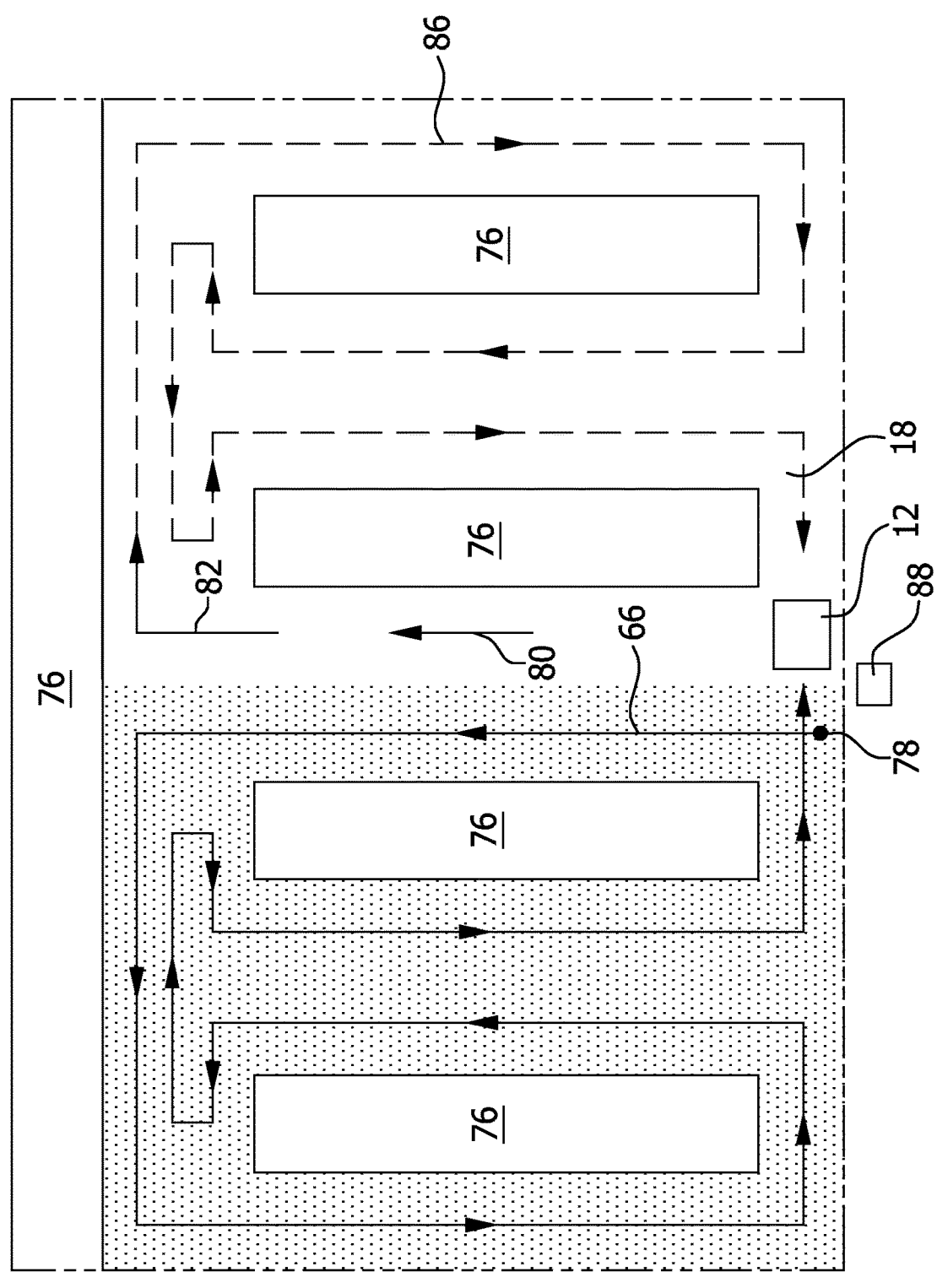
FIG. 4: a schematic representation of a room cleaned with the floor cleaning machine, cleaning paths, and cleaning-related information.

The floor cleaning system 10 is used to clean a floor surface 18, wherein the floor surface is the floor surface of a room 20 shown schematically in FIGS. 3 and 4.

The floor cleaning machine 12 is user-guided and can be moved over the floor surface 18 by a user (not shown in the drawing) to clean it. Thereby, the working direction is selected and set by the user.

In the present case, the floor cleaning machine 12 is configured as a user-guided scrubbing machine 22. In particular, this is a walk-behind machine that is controlled by the user with respect to a direction of movement 24 via an operating device 28 located on the rear side 26.

The floor cleaning machine 12 comprises a cleaning device 30. The cleaning device 30 comprises a cleaning tool 32 and a drive device 34 for the cleaning tool 32. In the present example, the cleaning tool 32 is a disk brush that can be driven in rotation about a vertical axis by means of the drive device 34.

Dirt can be dislodged from the floor surface 18 by the action of the cleaning tool 32. A cleaning liquid, in particular, water, which is stored in a reservoir 36, is used to support this.

The mixture of dirt and cleaning fluid can be picked up from the floor surface 18 by a dirt collection device 38 and transferred to a dirty liquid tank 40.

The floor cleaning machine 12 comprises a metering device 42. A cleaning chemical that increases the cleaning performance can be added to the cleaning liquid via the metering device 42.

Moreover, the floor cleaning machine 12 comprises a pressing device 44, which can be part of the cleaning device 30, for example. By means of the pressing device 40, the contact pressure of the cleaning tool 32 on the floor surface 18 can be adjusted.

The floor cleaning machine 12 further comprises a chassis 46 having drive wheels. Of these, only one drive wheel 48 is shown in FIG. 1. Furthermore, a traction drive 50 is provided for the drive wheels 48.

Further, the floor cleaning machine 12 comprises a control device 52, a storage device 54, and a sensor device 56. The storage device 54 and the sensor device 56 are coupled to, and may be at least partially integrated with, the control device 52.

In a manner known per se, operating instructions of the user at the operating device 28 can be evaluated by the control device 52 and implemented for controlling the cleaning device 30, the metering device 42, the pressing device 44, the dirt collection device 38, and the traction drive 50.

The sensor device 56 comprises at least one sensor that can detect a state of movement of the floor cleaning machine 12. In particular, the distance traveled by the floor cleaning machine 12 during a cleaning process can be detected. Furthermore, changes in the direction of travel of the floor cleaning machine 12 can be detected.

For example, as sensors, the sensor device 56 can comprise wheel encoders 58 associated with the drive wheels 48.

Alternatively or in addition, an acceleration sensor 60 is provided, for example.

Alternatively or in addition, for example, a rotation rate sensor 62, configured as a gyroscope, is provided.

Further, a camera 64, for example, can be provided, e.g., as part of the sensor device 56, to provide images of the surrounding area of the floor cleaning machine 12.

Based upon the signals from the sensor device 56, during operation of the floor cleaning machine 12, the control device 52 can determine what kind of cleaning path the floor cleaning machine 12 has traveled during operation. FIG. 4 shows an example of a cleaning path 66, sketched in the room 20, that the user has traveled during the cleaning process with the floor cleaning machine 12. It is understood that this exemplary representation is non-limiting for the present invention.

The floor cleaning system 10 comprises at least one display device. In the present case, the accessory device 14 has a display device 68.

The floor cleaning system 10 is designed to display information on an image display 70 of the display device 68. The information may be provided by the control device 52. For this purpose, the accessory device 14 and the floor cleaning machine 12 may be in a communications link via communications interfaces. The communications link can be wireless and/or wired.

The floor cleaning machine 12 comprises a receptacle 72 for the accessory device 14. In the present case, the receptacle 72 is arranged on the operating device 28. The accessory device 14 can be detachably positioned on the receptacle 72.

If the accessory device 14 is positioned in the receptacle 72, it has a defined position on the floor cleaning machine 12.

The accessory device 14 comprises a camera 74, in particular, configured as a digital camera.

By means of the camera 74, the surrounding area of the floor cleaning machine 12 can be detected, and images relating thereto can be provided. Thereby, in particular, the surrounding area upstream in the direction of movement 24 of the floor cleaning machine 12 is detected. The images may be displayed on the display device 68.

FIG. 3 shows this schematically for the surrounding area of the floor cleaning machine 12 in the room 20. Here, a part of the room 20 is displayed on the display device 68, in particular, a section of the floor surface 18. In addition, objects 76 contained in the room 20 are displayed. The objects 76 are, for example, shelves if the room 20 is a sales room, such as a room of a retail store.

FIG. 4 schematically shows the position of the floor cleaning machine 12 in the room 20 when it assumes the position shown on the display device 68 in the representation in accordance with FIG. 3.

The defined position of the accessory device 14 in the receptacle 72 ensures that the detection field of the camera 74 assumes a defined position with respect to the floor cleaning machine 12.

Alternatively or in addition to the images taken by the camera 74, images taken by the camera 64 of the surrounding area may be taken and displayed on the display device 68.

During operation of the floor cleaning system 10, as mentioned, the signal from the sensor device 56 is used to determine the traveled cleaning path 66. Here, the cleaning path 66 is determined proceeding from a starting point 78 at which the cleaning process is started.

In the present case, the determination of the cleaning path 66 is free of mapping. In particular, no map of the room 20 is provided, within which map the starting point 78, the cleaning path 66, and the floor cleaning machine 12 are localized. Accordingly, the cleaning path 66 and the starting point 78 are determined without position information with respect to the floor surface 18 and the room 20, and in particular with respect to both an absolute reference system and a relative reference system.

The determination of the cleaning path 66 preferably serves, among other things, to check whether a cleaning task has been performed in accordance with the specifications. For this purpose, it is preferably provided in particular that the cleaning path 66 be determined only when the cleaning tool 32 is driven, and in particular when the drive device 34 is activated.

The cleaning path 66 can be determined as a polygonal traverse, e.g., using dead reckoning methods based upon signals from the sensor device 56.

During operation of the floor cleaning machine 12, the accessory device 14 is positioned in the receptacle 72. Without limiting general applicability, it is assumed that the floor cleaning machine 12 is moved over the floor surface 18 along the cleaning path 66 shown. The traveled cleaning path 66 is determined by the control device 52.

Depending upon the traveled cleaning path 66, the control device 52 controls the display device 68 in order to display cleaning-related information concerning the cleaning of the floor surface 18. In particular, there is the possibility of displaying such cleaning-related information using augmented reality (AR, augmented reality). Favorably, the information is thereby superimposed on the images of the surrounding area obtained by means of the camera 74.

Figure 2:
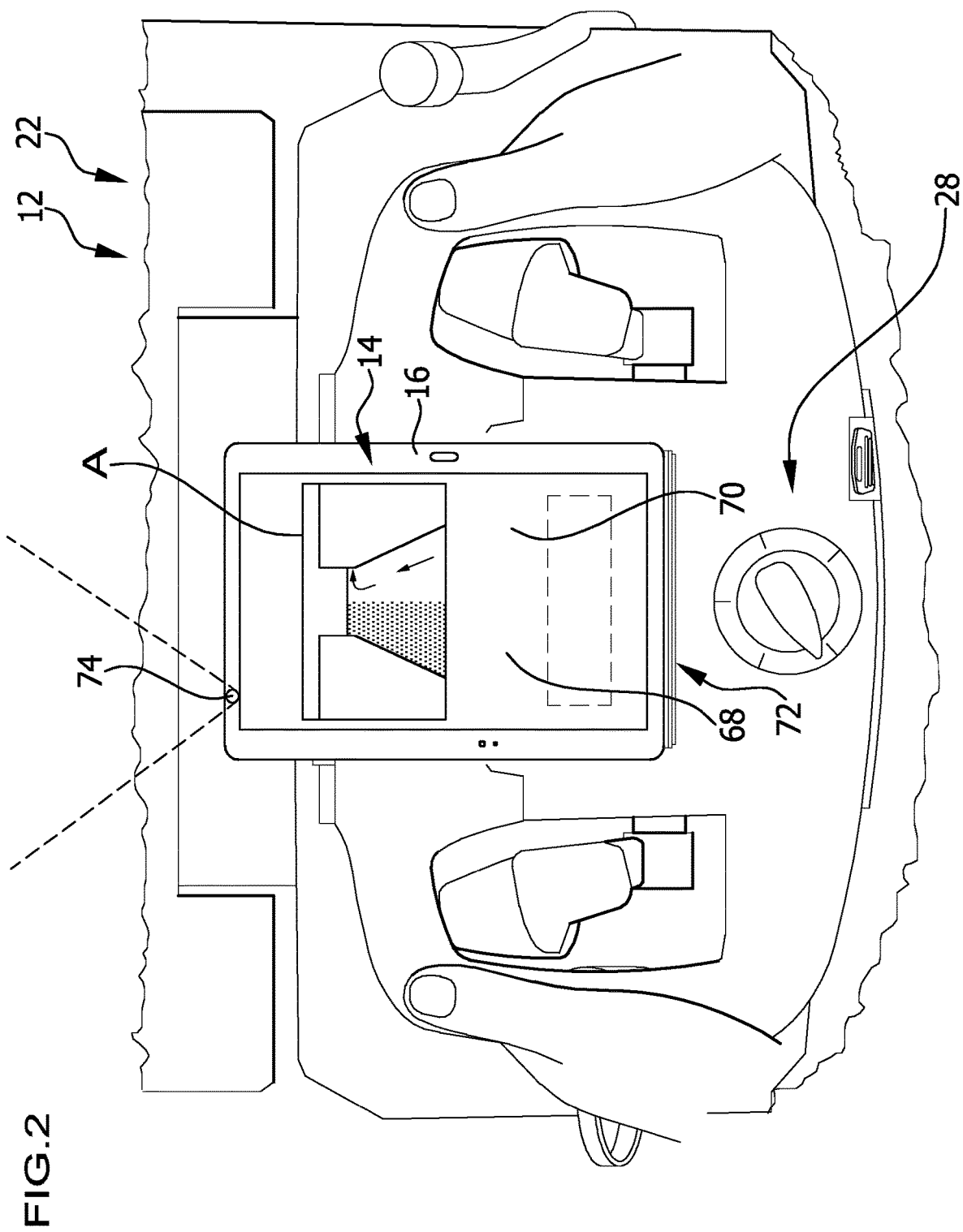
FIG. 2: a schematic top view of an operating device of the floor cleaning machine from FIG. 1, on which the accessory device is arranged.

FIG. 2 schematically illustrates the contents of the image display 70. An enlarged view of Detail A is shown schematically in FIG. 3.

The cleaning-related information is preferably displayed free of mapping and without position information.

For example, the cleaning information may have information concerning thus far cleaned sections of the floor surface 18, determined on the basis of the cleaning path 66. This is shown schematically in FIG. 3 by a dotted texture on the floor surface 18.

The cleaning-related information may comprise, for example, an identification of regions of the floor surface 18 that have not yet been cleaned. This is illustrated in FIG. 3 by a dashed texture of a section of the floor surface 18.

The display of the cleaning-related information is also based upon only the evaluation of the cleaning path 66. In particular, since the control device 52 is aware of the movements of the floor cleaning machine 12, it can determine where the floor cleaning machine 12 has not yet been.

The fitting of textures to floor surface sections and separating them from the objects 76, for example, can be accomplished with the aid of signals from the camera 64. For example, image processing algorithms are used to detect edges of the objects 76, allowing the objects 76 to be distinguished from the floor surface 18.

The cleaning-related information may further comprise information for the user for guiding the floor cleaning machine 12 for further cleaning. This is shown in FIG. 3 as an example by arrows 80, 82, which suggest a respective direction of travel.

The cleaning-related information may further comprise information concerning the successful use of a cleaning tool for cleaned sections of the floor surface 18 or the recommended use of a cleaning tool for uncleaned sections of the floor surface 18.

The cleaning-related information may further comprise, for example, the value of at least one operating parameter for cleaned sections of the floor surface 18 or the recommended value of at least one operating parameter for uncleaned sections of the floor surface 18.

Operating parameters are, for example, the metering of the cleaning chemical via the metering device 42, the contact pressure of the cleaning tool 32 by means of the pressing device 44, or the drive power of the drive device 34 for the cleaning tool 32.

Cleaning-related information, in order to be particularly easily perceived by the user, can be displayed, for example, by highlighting by means of a color and/or a texture. For example, it is possible to highlight sections of the floor surface 18 that require a particular use of the cleaning tool 32, a particular metering of cleaning chemical, or a particular drive power, using color or texture. Furthermore, it is possible, for example, to highlight webs that are to overlap each other to improve the cleaning result, either in color or by means of a texture.

The floor cleaning machine 12 can have a projection device 84. The projection device 84 can be used to project cleaning-related information onto the floor surface 18, for example, as an alternative or in addition to the display on the display device 68.

Preferably, it is possible to store the determined cleaning path 66 in the storage device 54. Preferably, information concerning the use of the cleaning tool 32 and the value of at least one operating parameter are stored.

The stored information can be evaluated in order to optimize cleaning processes. For example, a plurality of traveled cleaning paths 66 with related linked information can be stored, and compared and evaluated with respect to the best possible cleaning path 66 and/or the best possible cleaning result.

Furthermore, it is possible to check the cleaning process on the basis of the stored information.

A predetermined cleaning path 86 can be stored in the storage device 54. The predetermined cleaning path is preferably linked with information concerning the use of the cleaning tool 32 and the value of at least one operating parameter stored in the storage device 54.

The recommended cleaning path, shown by a dashed line in FIG. 4, can be loaded from the storage device 54 when the cleaning process is initiated at the starting point 78.

It is favorable if cleaning-related information is provided. Thereby, a display by means of augmented reality on the display device 68 is also possible. The cleaning-related information linked with the predetermined cleaning path 86 relates, for example, to instructions for moving the floor cleaning machine 12, a display of sections of the floor surface 18 to be cleaned, information concerning the rec-ommended use of the cleaning tool 32, and/or the value of at least one operating parameter. Preferably, operating parameters can be preset automatically.

In the present case, an operating parameter can also be the speed at which the floor cleaning machine 12 is moved.

For example, the predetermined cleaning path 86 can be loaded from the storage device 54 by the user.

Provision can be made for the floor cleaning system 10 to comprise a localization element 88 associated with the room 20. By means of the sensor device 56, the localization element 88 can preferably be detected. In this case, the cleaning path 86 associated with the room 20 can be loaded.

Thus, a plurality of rooms can be assigned respective, predetermined cleaning paths 86.

The predetermined cleaning path 86 can comprise infor-mation concerning the starting point 78 for the user. Such information can, for example, be a text-based or photo-graphic display of the starting point 78, with a suggested guiding direction for the floor cleaning machine 12.

During the cleaning process, the control device 52 can monitor whether the traveled cleaning path 66 matches the predetermined cleaning path 86. In the event of a deviation, the predetermined cleaning path 86 can be replaced, for example, by the traveled cleaning path 66 after completion of the cleaning process, and this can be stored for future cleaning processes. Alternatively or in addition, the user can be informed that the cleaning path 66 is deviating from the cleaning path 86.

Indications from the floor cleaning system 10 may be provided in various ways in addition to or different from the visual display on the display device 68, such as acoustically and/or haptically. A display device of the floor cleaning machine 12 can be used instead of the display device 68 of the accessory device 14. This display device is located, for example, in the operating device 28 and is covered by the accessory device 14 when it is in use.

LIST OF REFERENCE NUMERALS

10 Floor cleaning system
12 Floor cleaning machine
14 Accessory device
16 Tablet computer
17 Smartphone
18 Floor surface
19 Head-mounted display
20 Room
22 Scrubbing machine
24 Direction of movement
26 Rear side
28 Operating device
30 Cleaning device
32 Cleaning tool
34 Drive device
36 Reservoir
38 Dirt collection device
40 Dirty liquid tank
42 Metering device
44 Pressing device
46 Chassis
48 Drive wheel
50 Traction drive
52 Control device
54 Storage device
56 Sensor device
58 Wheel encoder
60 Acceleration sensor
62 Rotation rate sensor
64 Camera
66 Traveled cleaning path
68 Display device
70 Image display
72 Image
74 Camera
76 Object
78 Starting point
80, 82 Arrow
84 Projection device
86 Predetermined cleaning path
88 Localization element

The invention claimed is:

1. Floor cleaning system, comprising a user-guided floor cleaning machine for cleaning a floor surface, a sensor device, a control device, an actuatable display device, and a camera for providing images of a surrounding area located ahead of the floor cleaning machine in a direction of movement, wherein the floor cleaning machine comprises an operat-ing device for a user, a chassis for moving the cleaning machine over the floor surface, at least one cleaning device having a cleaning tool and a drive for the cleaning tool, wherein, during operation of the floor cleaning machine in which the floor cleaning machine is guided by the user using the operating device at the floor cleaning machine itself, a cleaning path along which, proceeding from a starting point, the cleaning machine travels over the floor surface is determined by the control device on the basis of signals from the sensor device, wherein the control device actuates the display device in order to display cleaning-related information, depending upon the cleaning path along which the cleaning machine is determined to have traveled, wherein the traveled cleaning path is determined only when the drive of the cleaning tool is activated, wherein the images provided by the camera are displayed on the display device together with the cleaning-related information, the cleaning-related information being displayed in a manner graphically superimposed using augmented reality on the images of the surrounding area on the display device depending upon the traveled cleaning path, and the cleaning-related information comprising information for the user for guiding the floor cleaning machine on the operating device.

2. Floor cleaning system in accordance with claim 1, wherein the traveled cleaning path is determined free of mapping.

3. Floor cleaning system in accordance with claim 2, wherein no map of a room comprising the floor surface, within which map at least one of the starting point and the cleaning path is localized, is provided.

4. Floor cleaning system in accordance with claim 1, wherein at least one of the starting point and the traveled cleaning path is determined without position information with respect to at least one of the floor surface and a room comprising the floor surface.

5. Floor cleaning system in accordance with claim 1, wherein the sensor device comprises or forms, as at least one sensor, at least one of the following:

wheel encoder for the chassis;

an acceleration sensor;

a rotation rate sensor;

a camera.

6. Floor cleaning system in accordance with claim 1, wherein the camera is arranged in a defined relative position on the floor cleaning machine.

7. Floor cleaning system in accordance with claim 1, wherein the floor cleaning machine or a portable accessory device comprises the camera.

8. Floor cleaning system in accordance with claim 1, wherein the cleaning-related information further comprises at least one of the following:

a display of thus far cleaned sections of the floor surface;

a display of sections of the floor surface that have not yet been cleaned;

a display of sections of the floor surface that are still to be cleaned;

instructions on the direction of travel of the floor cleaning machine;

information concerning the use that has taken place of at least one cleaning tool for cleaned sections of the floor surface;

information concerning the recommended use of at least one cleaning tool for uncleaned sections of the floor surface;

information concerning the value of at least one operating parameter for cleaned sections of the floor surface;

information concerning the recommended value of at least one operating parameter for uncleaned sections of the floor surface.

9. Floor cleaning system in accordance with claim 1, wherein the floor cleaning machine at least partially comprises or forms at least one of the following:

the sensor device;

the control device;

the display device.

10. Floor cleaning system in accordance with claim 1, wherein the floor cleaning system comprises at least one portable accessory device, which is operatively connected to the floor cleaning machine via cooperating communications interfaces.

11. Floor cleaning system in accordance with claim 10, wherein the accessory device at least partially comprises or forms at least one of the following:

the sensor device;

the control device;

the display device.

12. Floor cleaning system in accordance with claim 10, wherein a tablet computer, a smartphone, or a head-mounted display, for example, configured as data goggles, is provided as a portable accessory device.

13. Floor cleaning system in accordance with claim 10, wherein the floor cleaning machine comprises a receptacle for detachably arranging the at least one portable accessory device.

14. Floor cleaning system in accordance with claim 13, wherein the receptacle is arranged on the operating device.

15. Floor cleaning system in accordance with claim 1, wherein the floor cleaning system comprises a storage device for storing at least one of at least one traveled cleaning path and at least one predetermined cleaning path.

16. Floor cleaning system in accordance with claim 15, wherein at least one of the floor cleaning machine and the accessory device at least partially comprises the storage device.

17. Floor cleaning system in accordance with claim 15, wherein at least one of the traveled cleaning path and the predetermined cleaning path is storable so as to be linked to cleaning-related information concerning at least one of the use of at least one cleaning tool and the value of at least one operating parameter.

18. Floor cleaning system in accordance with claim 15, wherein a plurality of traveled cleaning paths is storable and, with regard to an optimized cleaning path, evaluated.

19. Floor cleaning system in accordance with claim 18, wherein the plurality of traveled cleaning paths is storable and evaluated so as to be linked to information concerning the use that has taken place of at least one cleaning tool and/or the value of at least one operating parameter.

20. Floor cleaning system in accordance with claim 15, wherein the at least one predetermined cleaning path is activatable when cleaning is initiated, and cleaning-related information is displayable on the display device.

21. Floor cleaning system in accordance with claim 20, wherein at least one of the following items of information is displayable:

information for the user for guiding the floor cleaning machine;

instructions on the direction of travel of the floor cleaning machine;

a display of sections of the floor surface to be cleaned;

information concerning the recommended use of at least one cleaning tool for uncleaned sections of the floor surface;

information concerning the recommended value of at least one operating parameter for uncleaned sections of the floor surface.

22. Floor cleaning system in accordance with claim 20, wherein the floor cleaning system comprises a camera for providing images of a surrounding area ahead of the floor cleaning machine in a direction of movement, and wherein the images are displayable on the display device together with the cleaning-related information.

23. Floor cleaning system in accordance claim 15, wherein the predetermined cleaning path comprises information concerning the starting point for the cleaning process, which information is displayable on the display device.

24. Floor cleaning system in accordance with claim 15, wherein the floor cleaning system comprises at least one localization element that is assigned to a room to be cleaned, wherein a link between the room and the predetermined cleaning path is stored in the storage device, and wherein the localization element is detectable by means of the sensor device, and the predetermined cleaning path is providable depending upon the detected localization element.

25. Floor cleaning system in accordance with claim 15, wherein the traveled cleaning path and the predetermined cleaning path are checkable for a match by the control device.

26. Floor cleaning system in accordance with claim 25, wherein, if there is no match, an indication to this effect is outputtable to the user, in particular, on the display device and/or in that, if there is no match, the predetermined cleaning path stored in the storage device is replaced by the determined cleaning path after completion of the cleaning.

27. Floor cleaning system in accordance with claim 1, wherein the floor cleaning system comprises a projector and wherein cleaning-related information is projectable onto the floor surface by the projector.

28. Floor cleaning system in accordance with claim 1, wherein the floor cleaning machine comprises a drive for driving drive wheels of the chassis.

29. Floor cleaning system in accordance with claim 1, wherein the floor cleaning machine is a walk-behind machine, a ride-on machine, or a stand-upon machine.

30. Floor cleaning system in accordance with claim 1, wherein the floor cleaning machine is a scrubbing machine or a sweeper.

31. Floor cleaning system in accordance with claim 1, wherein the floor cleaning system comprises a plurality of floor cleaning machines.

* * * * *